United States Patent
Chandra

(10) Patent No.: US 8,301,190 B2
(45) Date of Patent: *Oct. 30, 2012

(54) METHOD AND APPARATUS FOR SELECTING A MULTI-BAND ACCESS POINT TO ASSOCIATE WITH A MULTI-BAND MOBILE STATION

(75) Inventor: Arty Chandra, Manhasset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/880,583

(22) Filed: Sep. 13, 2010

(65) Prior Publication Data

US 2010/0330914 A1  Dec. 30, 2010

Related U.S. Application Data

(63) Continuation of application No. 11/284,242, filed on Nov. 21, 2005, now Pat. No. 7,797,018.

(60) Provisional application No. 60/667,523, filed on Apr. 1, 2005.

(51) Int. Cl.
*H04Q 7/20* (2006.01)

(52) U.S. Cl. ............... 455/552.1; 455/553.1; 455/550.1; 455/426.1; 455/426.2; 455/434; 370/329; 370/328; 370/343; 370/310

(58) Field of Classification Search ............... 455/552.1, 455/553.1, 550.1, 426.1, 426.2, 422.1, 403.5, 455/517, 434, 432.1, 432.2, 524, 525, 67.1, 455/456.1–457; 370/329, 328, 343, 310
See application file for complete search history.

(56) References Cited

U.S. PATENT DOCUMENTS

6,332,077 B1 12/2001 Wu et al.
6,563,810 B1 5/2003 Corazza
(Continued)

FOREIGN PATENT DOCUMENTS

WO 2004/057899 7/2004

OTHER PUBLICATIONS

IEEE, IEEE Standard for Information Technology—Telecommunications and information exchange between systems—Local and metropolitan area networks—Specific requirements, Part 11: Wireless LAN Medium Access Control (MAC) and Physical Layer (PHY) Specifications, IEEE Std. 802.11-2007 (Jun. 2007).

*Primary Examiner* — Keith Ferguson
(74) *Attorney, Agent, or Firm* — Volpe and Koenig, P.C.

(57) ABSTRACT

A method and apparatus for selecting one of a plurality of multi-band access points (APs) to associate with a multi-band wireless transmit/receive unit (WTRU) are disclosed. The multi-band APs broadcast frequency band information regarding multiple frequency bands on which the multi-band AP is configured to operate. The multi-band WTRU selects a particular multi-band AP to associate with and a frequency band to use to communicate with the selected multi-band AP based on the frequency band information. If the multi-band WTRU receives frequency band information from the selected multi-band AP which indicates that a characteristic, (e.g., throughput, path loss, load, capacity, backhaul), of the selected frequency band is unacceptable, the multi-band WTRU determines whether to disassociate with the selected multi-band AP or to continue to associate with the selected multi-band AP via a different frequency band.

14 Claims, 3 Drawing Sheets

U.S. PATENT DOCUMENTS

| | | |
|---|---|---|
| 7,362,776 B2 | 4/2008 | Meier et al. |
| 7,421,248 B1 | 9/2008 | Laux et al. |
| 2003/0139197 A1 | 7/2003 | Kostic et al. |
| 2004/0023652 A1 | 2/2004 | Shah et al. |
| 2004/0063426 A1 | 4/2004 | Hunkeler |
| 2004/0127214 A1 | 7/2004 | Reddy et al. |
| 2004/0137908 A1 | 7/2004 | Sinivaara et al. |
| 2004/0165571 A1 | 8/2004 | Reznik et al. |
| 2004/0224690 A1 | 11/2004 | Choi et al. |
| 2004/0255331 A1 | 12/2004 | Inoue et al. |
| 2005/0197136 A1 | 9/2005 | Friday et al. |
| 2006/0073827 A1 | 4/2006 | Vaisanen et al. |
| 2006/0251040 A1 | 11/2006 | Nitsche et al. |
| 2008/0259866 A1 | 10/2008 | Kostic et al. |

METHOD AND APPARATUS FOR SELECTING A MULTI-BAND ACCESS POINT TO ASSOCIATE WITH A MULTI-BAND MOBILE STATION

CROSS REFERENCE TO RELATED APPLICATION

This application claims the benefit of U.S. application Ser. No. 11/284,242 filed on Nov. 21, 2005, which claims priority to U.S. Provisional Patent Application No. 60/667,523 filed Apr. 1, 2005, which is incorporated by reference as if fully set forth.

FIELD OF INVENTION

The present invention relates to a wireless communication system including a plurality of multi-band access points (APs) and a multi-band wireless transmit/receive unit (WTRU), (i.e., a mobile station). More particularly, the present invention is related to a method and apparatus for selecting a particular one of the multi-band APs to associate with based on frequency band information transmitted from the multi-band APs to the multi-band WTRU.

BACKGROUND

A typical wireless local area network (WLAN) includes an AP which provides radio access to WTRUs in a coverage area of the AP. The AP is comprised by a basic service set (BSS) which is a basic building block of an IEEE 802.11-based WLAN. Multiple BSSs may be interconnected through a distribution system (DS) to form an extended service set (ESS).

The WLAN may be configured in an infrastructure mode or an Ad-hoc mode. In the infrastructure mode, wireless communications are controlled by an AP. The AP periodically broadcasts beacon frames to enable WTRUs to identify, and communicate with, the AP. In the Ad-hoc mode, a plurality of WTRUs operate in a peer-to-peer communication mode. The WTRUs establish communication among themselves without the need of coordinating with a network element. However, an AP may be configured to act as a bridge or router to another network, such as the Internet.

The WTRUs and the AP may be configured to utilize multiple frequency bands for communication. In a conventional wireless communication system, a multi-band WTRU transmits multiple probe requests on different channels of a frequency band to discover if there are any APs available in the area. Once an AP receives the probe request, it sends a probe response packet to the WTRU. The AP will send the probe response packet on its operating channel in a particular frequency band. The probe response packet contains required parameters, such as supported rate, or the like, for the WTRU to associate with the AP. The WTRU will send an association request packet and waits for an association response packet from an AP for further data communication.

Once associated, the multi-band WTRU may scan other frequency bands in search of a better communication band by transmitting a probe request packet and waiting for a probe response packet. Upon receiving another probe response packet, the WTRU compares the frequency bands and/or the AP and selects a more preferable frequency band and/or AP.

In the conventional wireless communication system, the multi-band WTRU must scan and compare different frequency bands to determine the frequency band that provides the best quality of wireless communications. However, these scanning and comparison functions are time-consuming and require a significant amount of battery power. A method and apparatus for reducing the amount of time and battery power required to make frequency band and channel selection decisions is desired.

SUMMARY

The present invention is related to a method and apparatus for selecting one of a plurality of multi-band APs to associate with a multi-band WTRU. The multi-band APs broadcast frequency band information regarding multiple frequency bands on which the multi-band AP is configured to operate. The multi-band WTRU selects a particular multi-band AP to associate with and a frequency band to use to communicate with the selected multi-band AP based on the frequency band information. If the multi-band WTRU receives frequency band information from the selected multi-band AP which indicates that a characteristic, (e.g., throughput, path loss, load, capacity, backhaul), of the selected frequency band is unacceptable, the multi-band WTRU determines whether to disassociate with the selected multi-band AP or to continue to associate with the selected multi-band AP via a different frequency band.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. Such WTRUs include, but are not limited to, phones, video phones, and Internet ready phones, personal data assistances (PDAs) and notebook computers with wireless modems that have network capabilities.

When referred to hereafter, the terminology "AP" includes but is not limited to a Node-B, a base station, a site controller or any other type of interfacing device in a wireless environment that provides other WTRUs with wireless access to a network with which the AP is associated.

The features and elements of the present invention may be implemented on a single IC, (such as an application specific integrated circuit (ASIC)), multiple ICs, discrete components or a combination of discrete components and ICs.

The present invention is applicable to any type of wireless communication systems including, but not limited to, 802.x-based wireless communication systems.

Figure 1:
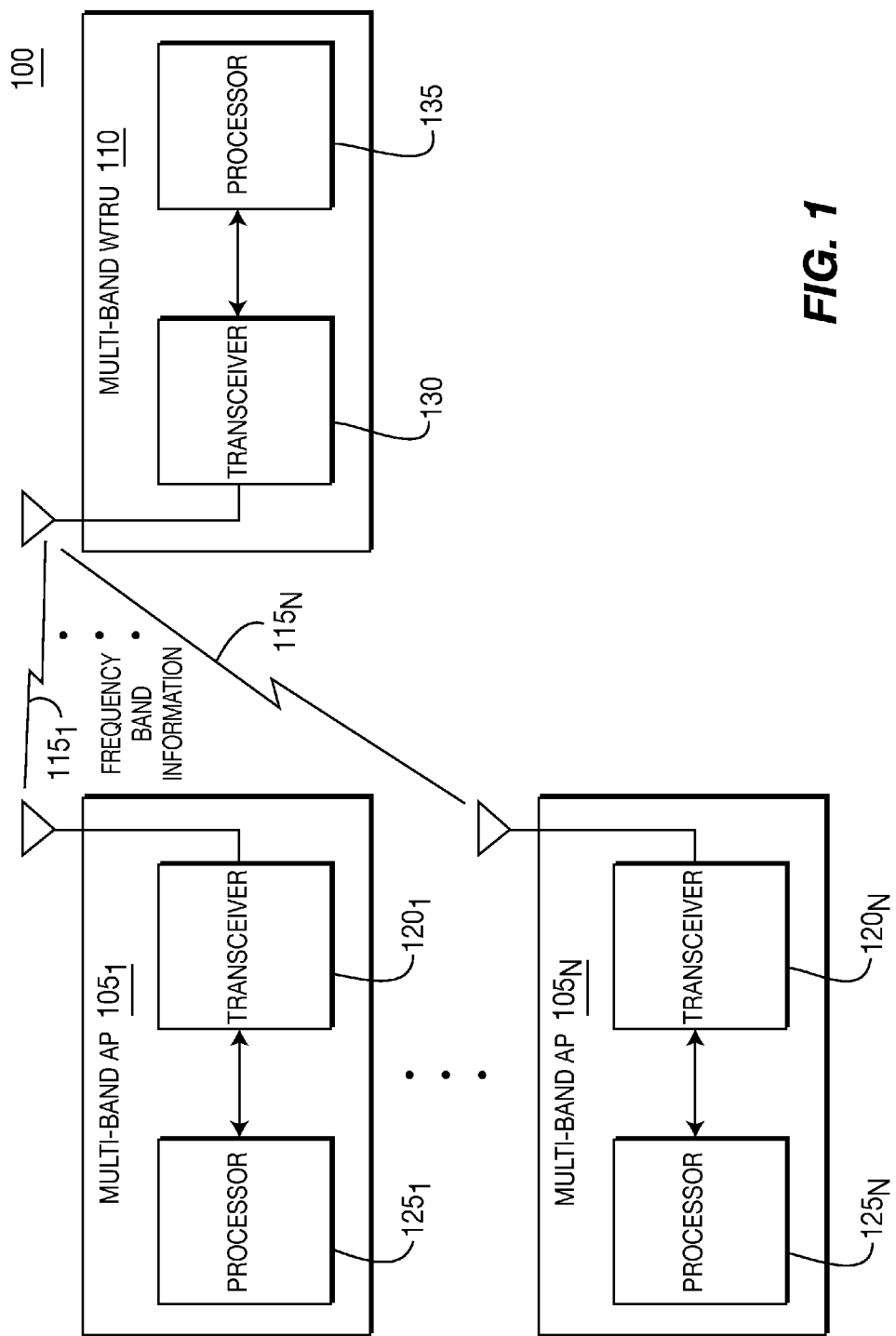
FIG. 1 shows a wireless communication system including a plurality of multi-band APs and a multi-band WTRU which operate in accordance with the present invention.

FIG. 1 shows a wireless communication system 100 including a plurality of multi-band APs $105_1$-$105_N$ and a multi-band WTRU 110 which operate in accordance with the present invention. Each of the multi-band APs $105_1$-$105_N$ and the multi-band WTRU 110 operate on at least two frequency bands. The multi-band APs $105_1$-$105_N$ transmit frequency band information $115_1$-$115_N$ which indicates the different multi-bands that the respective APs $105_1$-$105_N$ are configured to operate on. Each of the multi-band APs $105_1$-$105_N$ include a respective transceiver $120_1$-$120_N$ and a respective processor $125_1$-$125_N$. Each respective transceiver $120_1$-$120_N$ is configured to operate on at least two different frequency bands. Each respective processor $125_1$-$125_N$ generates and formats the respective frequency band information $115_1$-$115_N$ and provides it to the transceiver $120_1$-$120_N$ for transmission. The multi-band WTRU 110 also includes a transceiver 130 and a processor 135. The transceiver 130 is configured to operate on at least two different frequency bands. The processor 135 processes the frequency band information $115_1$-$115_N$ received by the transceiver 130 from the multi-band APs $105_1$-$105_N$, selects a multi-band AP 105 to associate with, and a frequency band to use in communication with the selected multi-band AP 105, based on the frequency band information $115_1$-$115_N$.

The multi-band WTRU 110 and the multi-band APs $105_1$-$105_N$ may use any management, control or data packet to provide the frequency band information to the multi-band WTRU 110. For example, an authentication frame, (which is a management frame), can also be used to send multi-band frequency information. Similarly, this packet can be piggy-backed on any of the current or future WLAN packets.

Alternatively, a proprietary message exchange between the multi-band WTRU 110 and the multi-band APs $105_1$-$105_N$ may also be utilized to provide the frequency band information to the multi-band WTRU 110.

Figure 2:
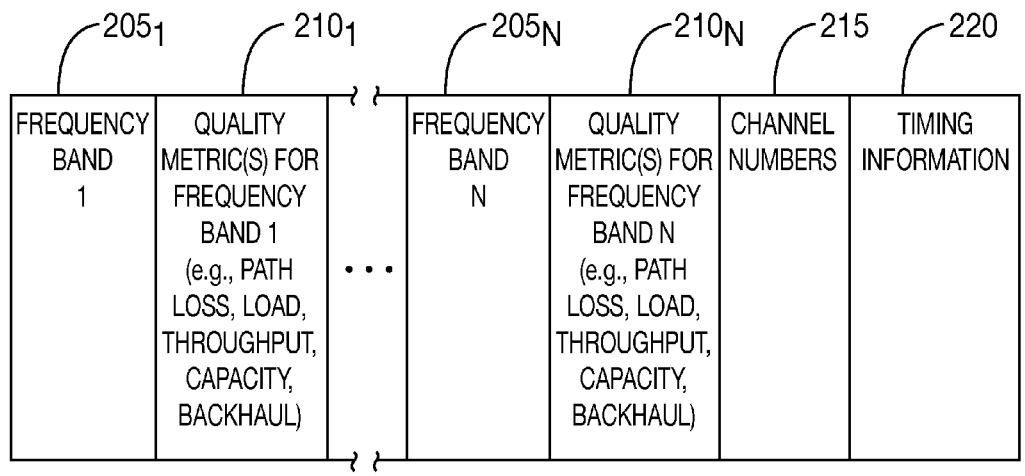
FIG. 2 is an exemplary beacon frame which comprises frequency band information transmitted from the multi-band APs to the multi-band WTRU of the wireless communication system of FIG. 1.

FIG. 2 shows an exemplary beacon frame which comprises frequency band information 115 transmitted from each of the multi-band APs $105_1$-$105_N$ to the multi-band WTRU 110 of the wireless communication system 100 of FIG. 1. The frequency band information 115 indicates whether a particular multi-band AP 105 supports multiple frequency bands $205_1$-$205_N$, channel numbers 215 and timing information 220 or the like.

The frequency band information 115 may further include quality metric information $210_1$-$210_N$ for each of the frequency bands $205_1$-$205_N$. The quality metric information may include, but is not limited to, path loss, load, (e.g., the number of associated WTRUs 110), throughput, capacity and backhaul on each frequency band.

Figure 3:
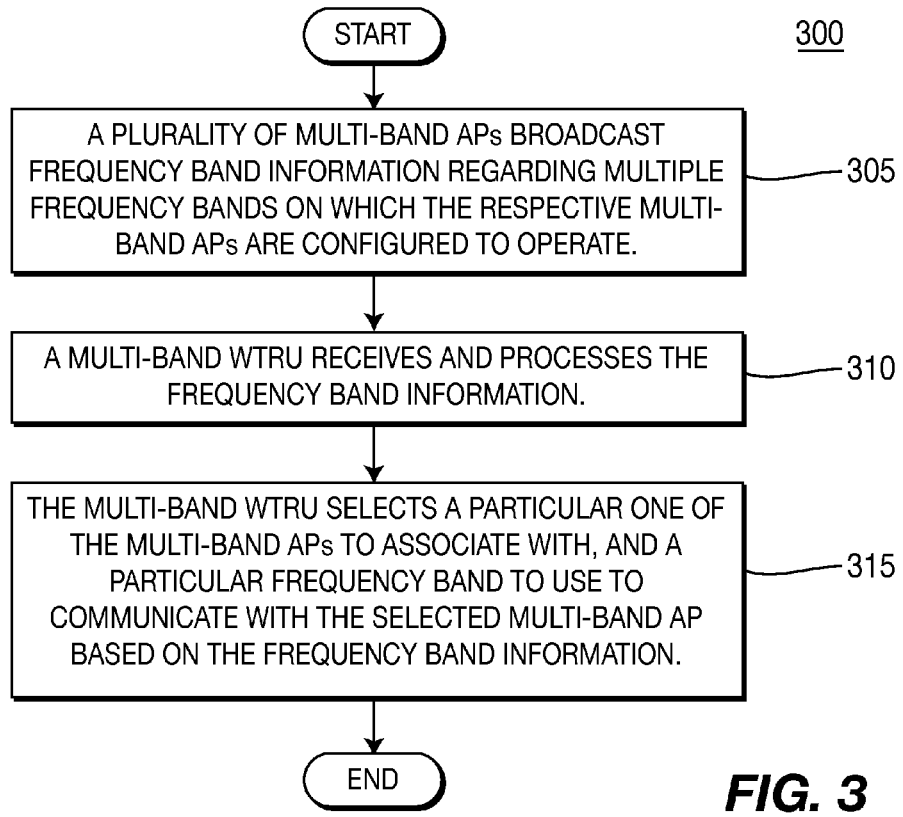
FIG. 3 is a flow diagram of a process for the multi-band WTRU to select one of the multi-band APs to associate with in accordance with the present invention.

FIG. 3 is a flow diagram of a process 300 for establishing a wireless communication link between a particular one of $115_1$-$115_N$ and the multi-band WTRU 110 in the wireless communication system 100 of FIG. 1 based on frequency band information $115_1$-$115_N$ transmitted from the multi-band APs $105_1$-$105_N$ to the multi-band WTRU 110. In step 305, a plurality of multi-band APs $105_1$-$105_N$ broadcast frequency band information $115_1$-$115_N$ regarding multiple frequency bands on which the respective multi-band APs $105_1$-$105_N$ are configured to operate. The frequency band information $115_1$-$115_N$ may be broadcast in a beacon frame, as shown in FIG. 2.

In step 310, a multi-band WTRU 110 receives and processes the frequency band information $115_1$-$115_N$. In step 315, the multi-band WTRU 110 selects a particular one of the multi-band APs $105_1$-$105_N$ to associate with, and a frequency band to use to communicate with the selected multi-band AP 105 based on the frequency band information $115_1$-$115_N$.

Figure 4:
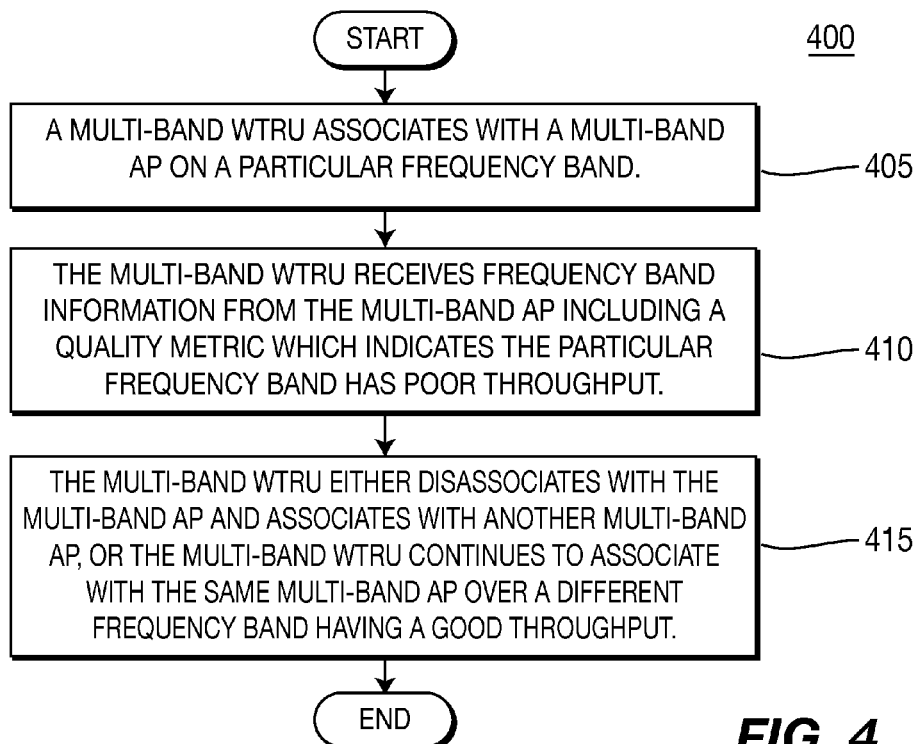
FIG. 4 is a flow diagram of a process for the multi-band WTRU to determine whether to change a particular frequency band used for wireless communications with a multi-band AP or to associate with a different multi-band AP in accordance with the present invention.

FIG. 4 is a flow diagram of a process 400 for the multi-band WTRU 110 to determine whether to change a particular frequency band used for wireless communications with a multi-band AP 105, or to associate with a different multi-band AP 105 in accordance with the present invention. In step 405, the multi-band WTRU 110 associates with a particular multi-band AP 105 on a particular frequency band. In step 410, the multi-band WTRU 110 receives frequency band information 115 from the particular multi-band AP 105 including a quality metric which indicates that the particular frequency band has, for example, poor throughput. In step 415, the multi-band WTRU 110 either disassociates with that the multi-band AP 105 and associates with another multi-band AP 105 continues to associate with the same multi-band AP 105 over a different frequency band for which the frequency band information 115 includes a quality metric which indicates a good, (i.e., high), throughput.

Figure 5:
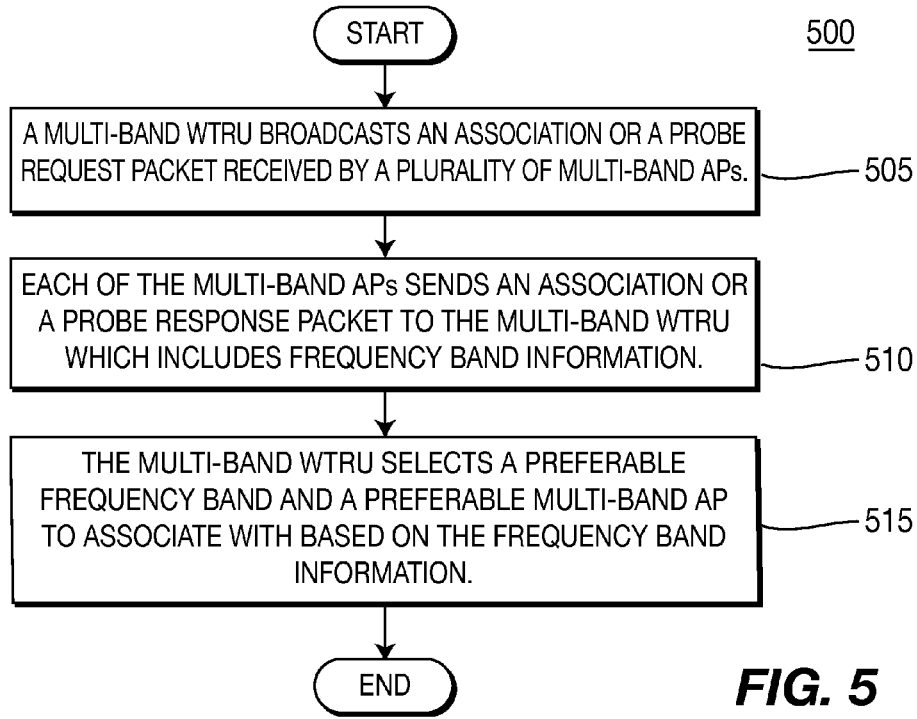
FIG. 5 is a flow diagram of a process for establishing a wireless communication link between the multi-band WTRU and a preferable multi-band AP over a preferable frequency band in accordance with the present invention.

FIG. 5 is a flow diagram of a process 500 for establishing a wireless communication link between the multi-band WTRU and a preferable multi-band AP over a preferable frequency band in accordance with the present invention. In step 505, a multi-band WTRU 110 broadcasts an association request packet or a probe request packet which is received by a plurality of multi-band APs $105_1$-$105_N$. The multi-band WTRU 110 may include an indication of the multi-band capability and related information of the WTRU 110 in the request packet. In step 510, each of the multi-band APs $105_1$-$105_N$ sends an association response packet or a probe response packet to the multi-band WTRU 110 which includes frequency band information $115_1$-$115_N$ in accordance with the multi-band capability of the WTRU 110. In step 515, the multi-band WTRU 110 selects a preferable frequency band and a preferable multi-band AP 105 to associate with based on the frequency band information $115_1$-$115_N$.

In another embodiment, the wireless communication system 100 may also include a single-band AP and a single-band WTRU, in addition to the multi-band APs $105_1$-$105_N$ and the multi-band WTRU 104a. If a single-band WTRU is associated with a multi-band AP 105, the information regarding the multiple frequency bands of the multi-band AP 105 other than information regarding the frequency band on which the single-band WTRU is configured to operate will be simply ignored by the single-band WTRU since the single-band WTRU not configured to communicate on multiple frequency bands. The single-band AP broadcasts its information regarding its single frequency band, (such as timing, load, or the like) in a beacon frame. Both a single-band WTRU and a multi-band WTRU 110 may utilize this information to decide whether or not to associate with the single-band AP.

In accordance with the present invention, the multi-band WTRU 110 is not required to consume significant time and battery power for scanning various frequency bands in search of an adequate AP to associate with. Moreover, by providing the multi-band WTRU 110 with quality metrics of each frequency band, (such as throughput), the WTRU is enabled to optimize not only its own throughput, but also the throughput of the AP 105.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in a multi-band wireless transmit/receive unit (WTRU), the method comprising:
   the WTRU sending a probe request message to a multi-band access point (AP), wherein the probe request message includes frequency band information that indicates a multiple frequency capability of the WTRU;
   the WTRU receiving a probe response message from the multi-band AP, wherein the probe response message is responsive to the probe request message and includes information regarding multiple frequency bands supported by the multi-band AP, wherein the multiple frequency bands include a first frequency band and a second frequency band;
   the WTRU associating with the multi-band AP and communicating with the multi-band AP on the first frequency band;
   the WTRU making a determination whether to disassociate from the multi-band AP or to continue to associate with the multi-band AP on the second frequency band; and
   the WTRU disassociating from the multi-band AP or continuing to associate with the multi-band AP on the second frequency band according to the determination.

2. The method of claim 1 wherein the determination is based on information that indicates that a quality metric of the first frequency band is unacceptable.

3. The method of claim 2 wherein the quality metric is throughput.

4. The method of claim 2 wherein the quality metric is path loss.

5. The method of claim 2 wherein the quality metric is load.

6. The method of claim 2 wherein the quality metric is capacity.

7. The method of claim 2 wherein the quality metric is backhaul.

8. A multi-band wireless transmit/receive unit (WTRU) comprising:
   a transceiver configured to:
      transmit a probe request message to a multi-band access point (AP), wherein the probe request message includes frequency band information that indicates a multiple frequency capability of the WTRU;
      receive a probe response message from the multi-band AP, wherein the probe response message is responsive to the probe request message and includes information regarding multiple frequency bands supported by the multi-band AP, wherein the multiple frequency bands include a first frequency band and a second frequency band;
      transmit an association request message to the multi-band AP;
      receive an association response message from the multi-band AP; and
      communicate data with the multi-band AP on the first frequency band; and
   a processor configured to:
      make a determination whether to disassociate from the multi-band AP or to continue to associate with the multi-band AP on the second frequency band;
   wherein the transceiver is further configured to disassociate the WTRU from the multi-band AP or to continue to associate with the multi-band AP on the second frequency band according to the determination.

9. The WTRU of claim 8 wherein the processor is configured make the determination based on information that indicates that a quality metric of the first frequency band is unacceptable.

10. The WTRU of claim 9 wherein the quality metric is throughput.

11. The WTRU of claim 9 wherein the quality metric is path loss.

12. The WTRU of claim 9 wherein the quality metric is load.

13. The WTRU of claim 9 wherein the quality metric is capacity.

14. The WTRU of claim 9 wherein the quality metric is backhaul.

* * * * *